United States Patent
Manco et al.

(10) Patent No.: US 7,153,802 B2
(45) Date of Patent: Dec. 26, 2006

(54) METHOD OF MAKING AN ELECTRODE FOR A MEMBRANE ELECTRODE ASSEMBLY AND METHOD OF MAKING THE MEMBRANE ELECTRODE ASSEMBLY

(75) Inventors: Judith Manco, Hartford, CT (US); Christopher Capuano, Windsor Locks, CT (US); Juan Nava, Chula Vista, CA (US); Flavio Tinoco, Buffalo, NY (US)

(73) Assignee: Proton Energy Systems, Inc., Wallington, CT (US)

( * ) Notice: Subject to any disclaimer, the term of this patent is extended or adjusted under 35 U.S.C. 154(b) by 93 days.

(21) Appl. No.: 10/820,639

(22) Filed: Apr. 7, 2004

(65) Prior Publication Data

US 2005/0227855 A1    Oct. 13, 2005

(51) Int. Cl.
*H01M 4/88* (2006.01)
*H01M 4/86* (2006.01)
*B01J 21/18* (2006.01)
*B05D 5/12* (2006.01)

(52) U.S. Cl. .................. 502/101; 502/182; 502/185; 427/115; 429/40; 429/41; 429/42; 429/43; 429/44

(58) Field of Classification Search .............. 502/101, 502/182, 185; 427/115; 429/40–44
See application file for complete search history.

(56) References Cited

U.S. PATENT DOCUMENTS

| | | | |
|---|---|---|---|
| 5,211,984 A * | 5/1993 | Wilson | 427/115 |
| 5,234,777 A | 8/1993 | Wilson | 429/33 |
| 5,415,888 A | 5/1995 | Banerjee et al. | 427/125 |
| 5,480,518 A | 1/1996 | Shane et al. | 204/129 |
| 5,702,755 A * | 12/1997 | Mussell | 427/115 |
| 6,187,468 B1 * | 2/2001 | Shinkai et al. | 429/42 |
| 6,391,487 B1 * | 5/2002 | Totsuka | 429/41 |
| 6,492,295 B1 * | 12/2002 | Hitomi et al. | 502/159 |
| 6,562,446 B1 * | 5/2003 | Totsuka | 428/304.4 |
| 6,592,934 B1 * | 7/2003 | Totsuka | 427/115 |
| 6,844,286 B1 * | 1/2005 | Kohler et al. | 502/101 |
| 6,911,411 B1 * | 6/2005 | Cox et al. | 502/159 |
| 2002/0034674 A1 * | 3/2002 | Starz et al. | 429/40 |
| 2002/0182478 A1 * | 12/2002 | Uchida et al. | 429/44 |
| 2003/0148159 A1 * | 8/2003 | Cox et al. | 429/30 |
| 2003/0170308 A1 * | 9/2003 | Cleary et al. | 424/486 |
| 2004/0023105 A1 * | 2/2004 | Hohenthanner et al. | 429/44 |
| 2005/0085379 A1 * | 4/2005 | Ishihara et al. | 502/180 |

* cited by examiner

Primary Examiner—J. A. Lorengo
Assistant Examiner—Patricia L. Hailey
(74) Attorney, Agent, or Firm—Cantor Colburn LLP

(57) ABSTRACT

A method of making an electrode decal, comprises forming a catalyst ink comprising a catalyst compound, a perfluorinated sulfonyl fluoride polymer, and an ester; disposing the catalyst ink on a decal; and drying the catalyst ink to form an electrode layer on the decal.

9 Claims, 3 Drawing Sheets

METHOD OF MAKING AN ELECTRODE FOR A MEMBRANE ELECTRODE ASSEMBLY AND METHOD OF MAKING THE MEMBRANE ELECTRODE ASSEMBLY

BACKGROUND

This disclosure relates to an electrochemical cell, and in particular to an electrode used therein and method of making the electrochemical cell comprising the electrode.

Electrochemical cells are energy conversion devices, usually classified as either electrolysis cells or fuel cells. A proton exchange membrane electrolysis cell may function as a hydrogen generator by electrolytically decomposing water to produce hydrogen and oxygen gas, and may function as a fuel cell by electrochemically reacting hydrogen with oxygen to generate electricity. Referring to FIG. 1, which is a partial section of an anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. Oxygen gas 104 and a portion of process water 108 exit cell 100, while protons 106 and water 110 migrate across a proton exchange membrane 118 to cathode 114 where hydrogen gas 112 is formed.

Another example of a water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

An exemplary fuel cell uses the same general configuration as is shown in FIG. 1. Hydrogen, from hydrogen gas, methanol, or other hydrogen source, is introduced to the hydrogen electrode (the anode in fuel cells), while oxygen, or an oxygen-containing gas such as air, is introduced to the oxygen electrode (the cathode in fuel cells). Water may also be introduced with the feed gas. Hydrogen electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode may be exploited to power an external load.

In other embodiments, one or more electrochemical cells may be used within a system to both electrolyze water to produce hydrogen and oxygen, and to produce electricity by converting hydrogen and oxygen back into water as needed. Such systems may be referred to as regenerative fuel cell systems.

Electrochemical cell systems may include one or more individual cells arranged in a stack, with the working fluids directed through the cells via input and output conduits formed within the stack structure. The cells within the stack are sequentially arranged, each including a cathode, a proton exchange membrane, and an anode (hereinafter "membrane electrode assembly", or "MEA"). Each cell may further comprise a first flow field in fluid communication with the cathode and a second flow field in fluid communication with the anode. The MEA may be supported on either or both sides by screen packs or bipolar plates disposed within the flow fields, which may be configured to facilitate membrane hydration and/or fluid movement to and from the MEA. In addition, to maintain intimate contact between cell components under a variety of operational conditions and over long time periods, uniform compression is applied to the cell components, particularly the active area, by pressure pads or other compression means.

However, while existing electrochemical cells, and in particular electrodes used therein and method of making the electrodes are suitable for their intended purposes, there still remains a need for improvements, particularly regarding the amount of catalyst consumed and utilized in making the electrode. Therefore, a need exists for a method of making an electrode comprising less catalyst material consumed with improved activity compared to existing electrodes.

SUMMARY

Disclosed herein are electrochemical cells, methods of making an electrode decal, and methods of making a membrane electrode assembly.

One embodiment of a method of making an electrode decal comprises forming a catalyst ink comprising a catalyst compound, a perfluorinated sulfonyl fluoride polymer, and an ester; disposing the catalyst ink on a decal; and drying the catalyst ink to form an electrode layer on the decal.

One embodiment of a method of making a membrane electrode assembly, comprises forming a catalyst ink comprising a catalyst compound, a perfluorinated sulfonyl fluoride polymer, and an ester; disposing the catalyst ink on a decal; drying the catalyst ink to form an electrode on the decal; transferring the electrode onto a first side of a proton exchange membrane, wherein the electrode is in ionic communication with the first side and wherein the catalyst compound loading on the proton exchange membrane is less than or equal to 1.5 mg/cm$^2$.

The above described and other features are exemplified by the following figures and detailed description.

BRIEF DESCRIPTION OF THE DRAWINGS

Referring now to the drawings, which are meant to be exemplary and not limiting, and wherein like elements are numbered alike in the several Figures.

DETAILED DESCRIPTION

Although the disclosure below is described in relation to a proton exchange membrane electrochemical cell employing hydrogen, oxygen, and water, other types of electrochemical cells and/or electrolytes may be used, including, but not limited to, phosphoric acid, and potassium hydroxide, and the like. Various reactants may also be used, including, but not limited to, hydrogen, bromine, methanol, oxygen, air, chlorine, and iodine. Upon the application of different reactants and/or different electrolytes, the flows and reactions are understood to change accordingly, as is understood in relation to that particular type of electrochemical cell. It is also noted that all ranges disclosed herein are inclusive of the end points and combinable. That is, a range of about 10 to about 80, with about 20 to about 50 preferred, includes the amounts of about 10 to about 50 as well as about 20 to about 80.

Figure 1:
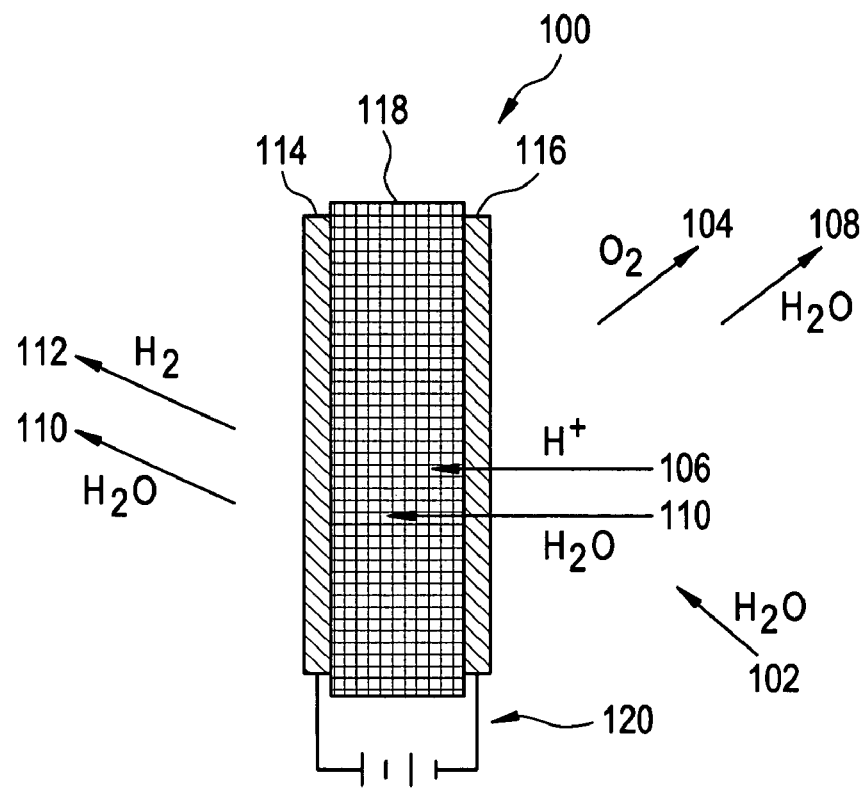
FIG. 1 is a schematic diagram of a partial prior art electrochemical cell showing an electrochemical reaction.
Figure 2:
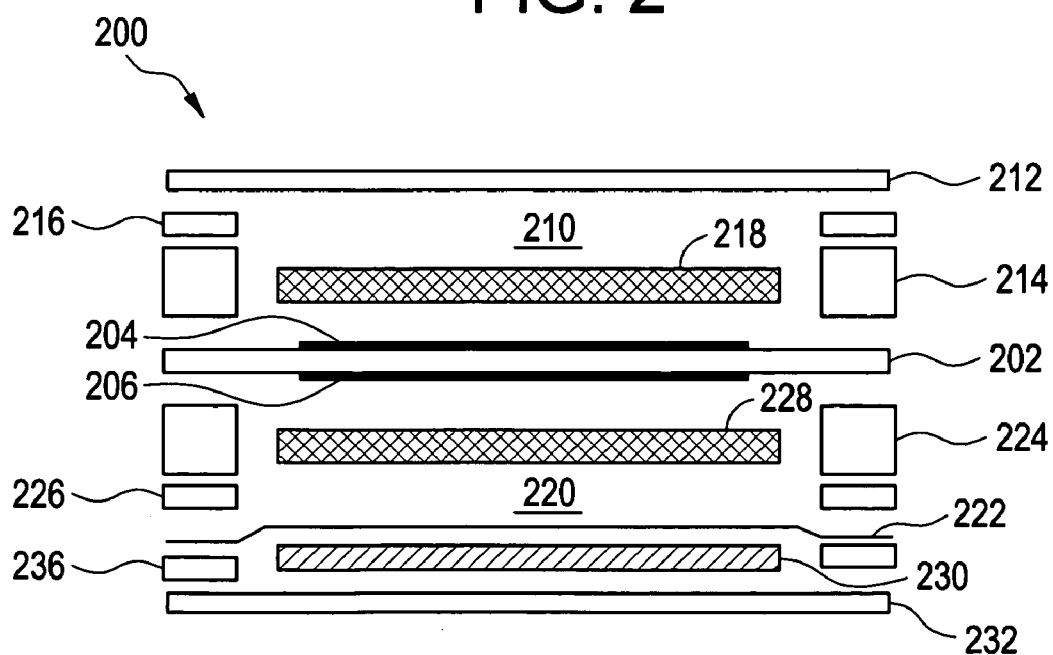
FIG. 2 is an expanded schematic diagram of an electrochemical cell system.

Referring to FIG. 2, a cell system 200 suitable for operation as an anode feed electrolysis cell, cathode feed electrolysis cell, fuel cell, or regenerative fuel cell is schematically shown. Thus, while the discussion below is directed to an anode feed electrolysis cell, cathode feed electrolysis cells, fuel cells, and regenerative fuel cells are also contemplated. Cell system 200 is an example of one of a plurality of cells employed in a cell stack as part of an electrochemical cell system. When cell system 200 is used as an electrolysis cell, power inputs are generally about 1.48 volts to about 3.0 volts, with current densities of about 50 A/ft$^2$ (amperes per square foot) to about 4,000 A/ft$^2$. When used as a fuel cell power outputs are about 0.4 volts to about 1 volt, and about 0.1 A/ft$^2$ to about 10,000 A/ft$^2$. The number of cells within the stack, and the dimensions of the individual cells is scalable to the cell power output and/or gas output requirements.

Cell system 200 includes a membrane 202 having a first electrode (e.g., an anode) 204 and a second electrode (e.g., a cathode) 206 disposed on opposite sides thereof. Flow fields 210, 220, which are in fluid communication with electrodes 204 and 206, respectively, are defined generally by the regions proximate to, and bounded on at least one side by, each electrode 204 and 206 respectively. A flow field member 228 may be disposed within flow field 220 between electrode 206 and, optionally, a pressure pad separator plate 222. A pressure pad 230 may be disposed between pressure pad separator plate 222 and a cell separator plate 232. Cell separator plate 232 is disposed adjacent to pressure pad 230. A frame 224, generally surrounding flow field 220 and an optional gasket 226, is disposed between frame 224 and pressure pad separator plate 222 generally for enhancing the seal within the reaction chamber defined on one side of cell system 200 by frame 224, pressure pad separator plate 222 and electrode 206. Gasket 236 may be disposed between pressure pad separator plate 222 and cell separator pad 232 enclosing pressure pad 230.

Another flow field member 218 may be disposed in flow field 210. A frame 214 generally surrounds flow field member 218, a cell separator plate 212 is disposed adjacent flow field member 218 opposite electrode 204, and a gasket 216 is disposed between frame 214 and cell separator plate 212, generally for enhancing the seal within the reaction chamber defined by frame 214, cell separator plate 212 and the oxygen side of membrane 202. The cell components, particularly cell separator plates 212, 232, frames 214, 224, and gaskets 216, 226, and 236 are formed with the suitable manifolds or other conduits.

Membrane 202 comprises electrolytes that are preferably solids or gels under the operating conditions of the electrochemical cell. Useful materials include proton conducting ionomers and ion exchange resins. Useful proton conducting ionomers include complexes comprising an alkali metal salt, an alkali earth metal salt, a protonic acid, or a protonic acid salt. Useful complex-forming reagents include alkali metal salts, alkaline metal earth salts, and protonic acids and protonic acid salts. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Additionally, copolymers of, e.g., polyethylene glycol with dialkylsiloxanes, maleic anhydride, or polyethylene glycol monoethyl ether with methacrylic acid, exhibit sufficient ionic conductivity to be useful. The membrane 202 can also comprises a combination comprising at least one of the above materials.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins may include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins may exhibit excellent resistance to oxidation by halogen, strong acids and bases. One family of fluorocarbon-type resins having sulfonic acid group functionality is NAFION® resins (commercially available from E.I. du Pont de Nemours and Company, Wilmington, Del.).

Electrodes 204 and 206 comprise catalyst suitable for performing an electrochemical reaction (i.e., electrolyzing water to produce hydrogen and oxygen). Suitable electrodes comprise, but are not limited to, platinum, palladium, rhodium, carbon, gold, tantalum, tungsten, ruthenium, iridium, osmium, as well as alloys and combinations comprising at least one of the foregoing, and the like. As will be discussed in greater detail, electrodes 204 and 206 may be formed on membrane 202, or may be layered adjacent to, but in ionic communication with, membrane 202.

Flow field members 218, 228, support membrane 202, allow the passage of system fluids, and preferably are electrically conductive, and may be, for example, screen packs or bipolar plates. The screen packs include layer(s) of perforated sheets or a woven mesh formed from metal or strands. These screens may comprise metals, for example, niobium, zirconium, tantalum, titanium, carbon steel, stainless steel, nickel, cobalt, and alloys comprising at least one of the foregoing. Bipolar plates may be porous structures comprising fibrous carbon or fibrous carbon impregnated with polytetrafluoroethylene (PTFE) (commercially available under the trade name TEFLON® from E.I. du Pont de Nemours and Company).

Pressure pad 230 provides even compression between cell components, is electrically conductive, and therefore generally comprises a resilient member, preferably an elastomeric material, together with a conductive material. Suitable elastomeric materials include, but are not limited to silicones, such as, for example, fluorosilicones; fluoroelastomers, such as KALREZ® (commercially available from E.I. du Pont de Nemours and Company), VITON® (commercially available from E.I. du Pont de Nemours and Company), and FLUOREL® (commercially available from Minnesota Mining and Manufacturing Company, St. Paul, Minn.); and combinations comprising at least one of the foregoing. The electrically conductive material is preferably compatible with the system fluids and membrane 202. Suitable electrically conductive materials include, but are not limited to, conductive metals and alloys and superalloys comprising at least one of the foregoing, for example niobium; zirconium; tantalum; titanium; niobium; iron and iron alloys, for examples steels such as stainless steel; nickel and nickel alloys such as HASTELLOY™ (commercially available from Haynes International, Kokomo, Ind.); cobalt and cobalt superalloys such as ELGILOY™ (commercially available from Elgiloy® Limited Partnership, Elgin, Ill.) and MP35N™ (commercially available from Maryland Specialty Wire, Inc., Rye, N.Y.); hafnium, and tungsten, among others, with titanium preferred because of its strength, durability, availability, low cost, ductility, low density, and its compatibility with the electrochemical cell environment. Conductive carbon may also be used. In an exemplary embodiment, the electrically conductive material comprises a plurality of VITON® cords woven or stitched into a conductive carbon cloth substrate. Pressure pad 230 may be porous to allow passage of water or system gases. Pressure pad 220 is capable of maintaining intimate contact to cell components at cell pressures up to or exceeding about 100 psi, preferably about 500 psi, more preferably about 2,500 psi, or even more preferably about 10,000 psi. The pressure pads may thus be introduced into a high-pressure electrochemical cell environment.

In a method of making a cell system, an electrode ink (e.g., a catalyst component, a suspension medium, and optionally a binder) is used to form first electrode (e.g., an anode) 204 and second electrode (e.g., a cathode) 206 disposed on opposite sides of membrane 202. First electrode 204 and second electrode 206 may both be made using the same catalyst-based electrode ink composition, or in other embodiments the second electrode may be made using a different catalyst-based electrode ink composition. Additionally, if the same catalyst-based electrode ink is used for both electrodes, second electrode 206 may have a different thickness compared to first electrode 204. For example, the electrode may have a thickness less than or equal to about 2 micrometers, with a thickness of about 0.5 micrometers to about 1 micrometer preferred. In other words, the design of the electrodes may vary depending on the application. Although the catalyst-based electrode ink disclosed herein is preferably used on at least the hydrogen side of the membrane 202, i.e., as the cathode 206, it can be employed on the oxygen side, i.e., the anode side 204.

As will be discussed in greater detail, the catalyst consumption and utilization in an electrode may be improved by forming an ink having the catalyst dispersed in a solvent base. The solvent is preferably of a nature similar to that of membrane 202. The formulated ink may then be spread on, e.g., a decal each as a substrate comprising polytetrafluoroethylene (PTFE) (e.g., that commercially available under the trade name TEFLON® from E.I. du Pont de Nemours and Company). The ink is dried (i.e., the solvents and water are removed) to form an electrode on the decal. As will be described in greater detail, the decal can be employed to transfer the electrode onto membrane 202.

Suitable materials for catalyst component include, but is not limited to, platinum, palladium, rhodium, carbon, gold, tantalum, tungsten, ruthenium, iridium, osmium, alloys comprising at least one of the foregoing, and the like. Platinum, e.g., platinum black, is preferred for the hydrogen side electrode. The catalyst component may be incorporated in the ink in a form of a powder. For example, the catalyst component may have a particle size of about 10 nanometers to about 100 nanometers (nm), with about 15 nm to about 50 nm preferred.

The suspension medium acts as a solvent, carrier, or suspension agent for the catalyst component. In addition, the suspension medium acts as a viscosity-regulating agent, which may facilitate the printing or coating of the electrode ink on the surface of the membrane, without interacting with the ion exchange polymers contained in the membrane. The suspension medium is preferably an ester compatible with the material comprising the membrane 202. Suitable suspension media include, but are not limited to, esters, preferably esters synthesized from acetic acid, such as n-propyl acetate.

While n-propyl acetate is used in the following discussion and examples for convenience, it is understood that other esters are envisioned. Advantageously, n-propyl acetate is less expensive compared to other solvents used in current ink designs, e.g., 1-methoxy 2-propanol (hereinafter "MOP"). Additionally, n-propyl acetate is a more volatile organic compound compared to MOP. As such, it may be more readily evaporated than MOP, thereby possibly reducing manufacturing time.

The binder may be a hydrolyzed or unhydrolyzed sulfonyl fluoride polymer in solution. The polymer may be used as a binder for the electrode and the ion exchange membrane. As such, the polymer is preferably the same material used in membrane 202. The polymer facilitates the bond between the electrode ink and the surface of the membrane without significantly impairing or reducing the ionic conductivity of the membrane and electrode structure. In an exemplary embodiment, the binder is a perfluorinated polymer (e.g., a perfluorinated sulfonyl fluoride polymer such as NAFION® commercially available from E.I. du Pont de Nemours and Company, Wilmington, Del.).

The ink composition may further comprise a viscosity regulating agent. Suitable viscosity regulating agents include, but are not limited to, cellulose type materials (such as carboxymethyl cellulose, methyl cellulose, hydroxyethyl cellulose, and cellulose, and the like), polyethyleneglycol, polyvinyl alcohol, polyvinyl pyrrolidone, sodium polyacrylate, and polymethyl vinyl ether, and the like, as well as combinations comprising at least one of the foregoing regulating agents. In an exemplary embodiment, the binder is polyvinyl alcohol, which acts as surfactant.

In an exemplary embodiment, the catalyst compound is platinum black, the suspension medium is n-propyl acetate, the binder is a perfluorinated sulfonyl fluoride polymer such as NAFION®, and the viscosity regulating agent is polyvinyl alcohol. When the water is evaporated from the ink, the ink preferably has the following composition (i.e., the dry weight): about 20 wt % to about 30 wt % platinum black, about 15 wt % to about 20 wt % n-propyl acetate, about 40 wt % to about 50 wt % NAFION®, and about 5 wt % to about 10 wt % polyvinyl alcohol, wherein the weight percentages are based on the total weight of the ink. The ink has a density of about 0.5 grams per milliliter (g/ml) to about 5 g/ml, wherein a density of about 1 g/ml to about 3 g/ml is preferred.

The ink may be printed on the surface of a substrate (decal) by, for example, screen-printing. A screen having a mesh size of about 80 (i.e., 177 micrometers, 0.0069 inches) to about 100 (i.e., 149 micrometers, 0.0058 inches) may be used, with a mesh size of about 80 more preferred. The screen comprises a material having a sufficient strength for screen-printing such as stainless steel, polyethyleneterephthalate, and nylon.

In making the electrode(s), for example, the ink is first fed onto the screen to wet the screen. Once the screen has been wetted, the ink is printed under a desired pressure by squeegee wherein the electrode layer is formed on the surface of the substrate. The thickness of the electrode layer on the membrane may depend on the thickness of the screen, the viscosity of the ink and the mesh size of the screen. In a start-up operation, the ink is retained in the screen (i.e., the wetting step), which may be about 2 passes using a hand squeegee. The same screen is used for the production of additional electrodes, which results in single (1) pass screen-printing per electrode. As such, this method offers an advantage over existing methods that use 2 or more passes per electrode. In other words, production time may be reduced compared to methods that use two or more passes. Additionally, the resulting electrode has the same activity as an electrode made using 2 passes. However, unlike current electrode designs, the electrodes disclosed herein have a much lower loading. For example, current electrodes designs may have a catalyst metal (e.g., platinum) loading of about 2 milligrams per square centimeter ($mg/cm^2$) to about 7 $mg/cm^2$, whereas electrodes disclosed herein have a platinum loading of less than or equal to about 1.5 $mg/cm^2$, with a loading of about 0.5 $mg/cm^2$ to about 0.8 $mg/cm^2$ preferred. While attaining substantially the same activity, this is a significant improvement over existing electrode loadings, which allows for a reduction in the catalyst material used. As such, electrodes can be made in a shorter amount of time and at a reduced cost compared to electrodes using 2 passes and having a catalyst loading of greater than 2 $mg/cm^2$.

After screen printing, the substrate (decal) is heated in an oven at a temperature of about 60° C. to about 100° C. to dry the electrode to remove/eliminate solvents and water, with a temperature of about 60° C. to about 80° C. more preferred. The substrate is heated for a time of about 15 minutes to about 30 minutes. The decal may then be hot pressed onto the surface of the ion exchange membrane (e.g., 202). The electrode is transferred from the decal to membrane 202, wherein the electrode readily adheres to the membrane thereby reducing the likelihood of delamination of the electrode structure.

An advantage of the decal approach is that it permits the removal of ink solvents prior to pressing. Solvents may adversely affect the membrane, i.e., destroy the membrane. As such, transferring the ink to a decal and removing the solvent can reduce damage to the membrane. Additionally, these methods may yield electrodes that are subject to less mudcracking compared to methods where the ink is applied directly to the membrane. Additionally, the approach simplifies fixturing the membrane for printing, and allows for printing and storage of large quantities of catalyst electrodes, which may also facilitate the production of customized membrane and electrode structures.

The resulting electrode used in a membrane electrode assembly preferably has the following characteristics, when measured at room temperatures (i.e., a temperature of about 70° F. (about 22° F.)): a lateral electrical resistance on the hydrogen side of less than or equal to about 50 Ohms, a cross cell electrical resistance of less than or equal to about 18 milliohms (mOhms), and a lateral electrical resistance on the oxygen side of less than or equal to about 700 Ohms. The term "lateral" is used herein to generally to describe the resistance on/through the electrode. In comparison, the term "cross cell" is used herein to describe the electrical resistance through a membrane electrode assembly. Preferably, the lateral electrical resistance on the hydrogen side is less than or equal to about 10 Ohms when using the catalyst ink disclosed herein, with less than or equal to about 5 Ohms preferred. In other words, the electrode employed on the hydrogen side of a cell is cable of having a lateral electrical resistance of less than or equal to about 10 Ohms, with less than or equal to about 5 Ohms preferred.

The electrode is further illustrated by the following non-limiting examples.

EXAMPLES

An ink having composition shown in Table 1 was prepared by the following method.

TABLE 1

| | Weight (grams) | Solution wt %[1] | Ink wt %[2] (Water evaporated) |
|---|---|---|---|
| NAFION ® Solution (10 wt % solids) | 2.9 | 6.0 | 48.9 |
| Pt-black | 1.536 | 3.2 | 25.9 |
| Polyvinyl alcohol 87–89 wt % | 1.0 | 2.1 | 16.8 |
| n-propyl acetate | 0.5 | 1.0 | 8.4 |
| Water | 42.1 | 87.6 | 0 |

[1]based upon the total weight of the solution
[2]based upon the total weight of the ink The catalyst ink preparation comprised heating, at 100° C. for 5 minutes, NAFION® solution, in a beaker, while stirring. The polyvinyl alcohol (PVA) was then dissolved in the solution with the n-propyl acetate added to help complete the dissolution of the PVA. The solution was then heated to a boil. In a separate beaker, a suspension was made with deionized water and the Pt-black and then added to the solution. The mixture of the solution and suspension was boiled to reduce the volume by about 30%. The density of the mixture was measured with a picnometer to ensure the density was about 1.20 to about 1.25 grams per milliliter (g/ml). If the density was higher, the mixture was heated until the desired density was obtained.

After preparing the catalyst ink, the ink was applied (screen printed) onto a substrate (decal) using a stainless steel screen with a mesh size 80 (i.e., 177 micrometers, 0.0069 inches). The decal was then dried in an oven at 70° C. for 15 minutes. The decal was then used to make two sample membrane electrode assemblies by hot pressing the decal onto a membrane at a temperature of about 178° C. and a pressure of 13,800 kilopascals (kPa; about 2,000 pounds per square inch (psi)) for about 30 minutes. The area of the cell used was 91.5 squared centimeters ($cm^2$) (about 0.1 $ft^2$), with a platinum loading per cell of 0.5 $mg/cm^2$ to 0.8 $mg/cm^2$. Two MEAs (Cell A and Cell C) were manufactured using the catalyst ink disclosed herein for the hydrogen side (i.e., having a platinum loading of 0.5 $mg/cm^2$ to 0.8 mg/cm$^2$). A third MEA (Cell B) did not use the catalyst ink disclosed herein. Cell B was a standard production cell made by Proton Energy Systems. Cell B comprised a hydrogen side electrode having a platinum loading of 4 mg/cm$^2$. The catalyst used for the oxygen side was the same for all three catalysts, i.e., platinum/iridium. The oxygen side electrode had a platinum/iridium loading of 6 mg/cm$^2$.

Figure 3:
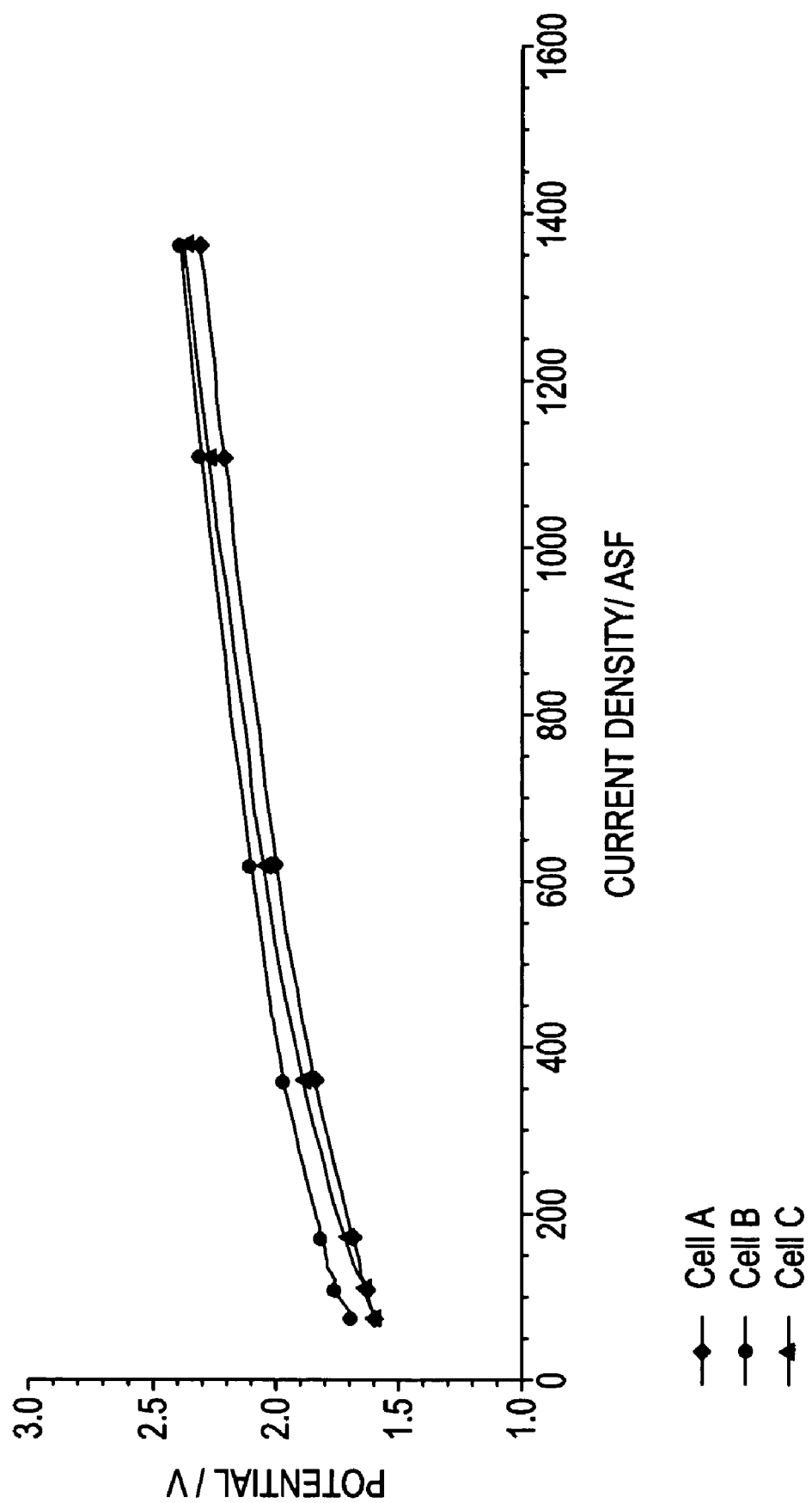
FIG. 3 is a polarization curve for Cell A, Cell B, and Cell C after a test duration of 1,388 hours.
Figure 4:
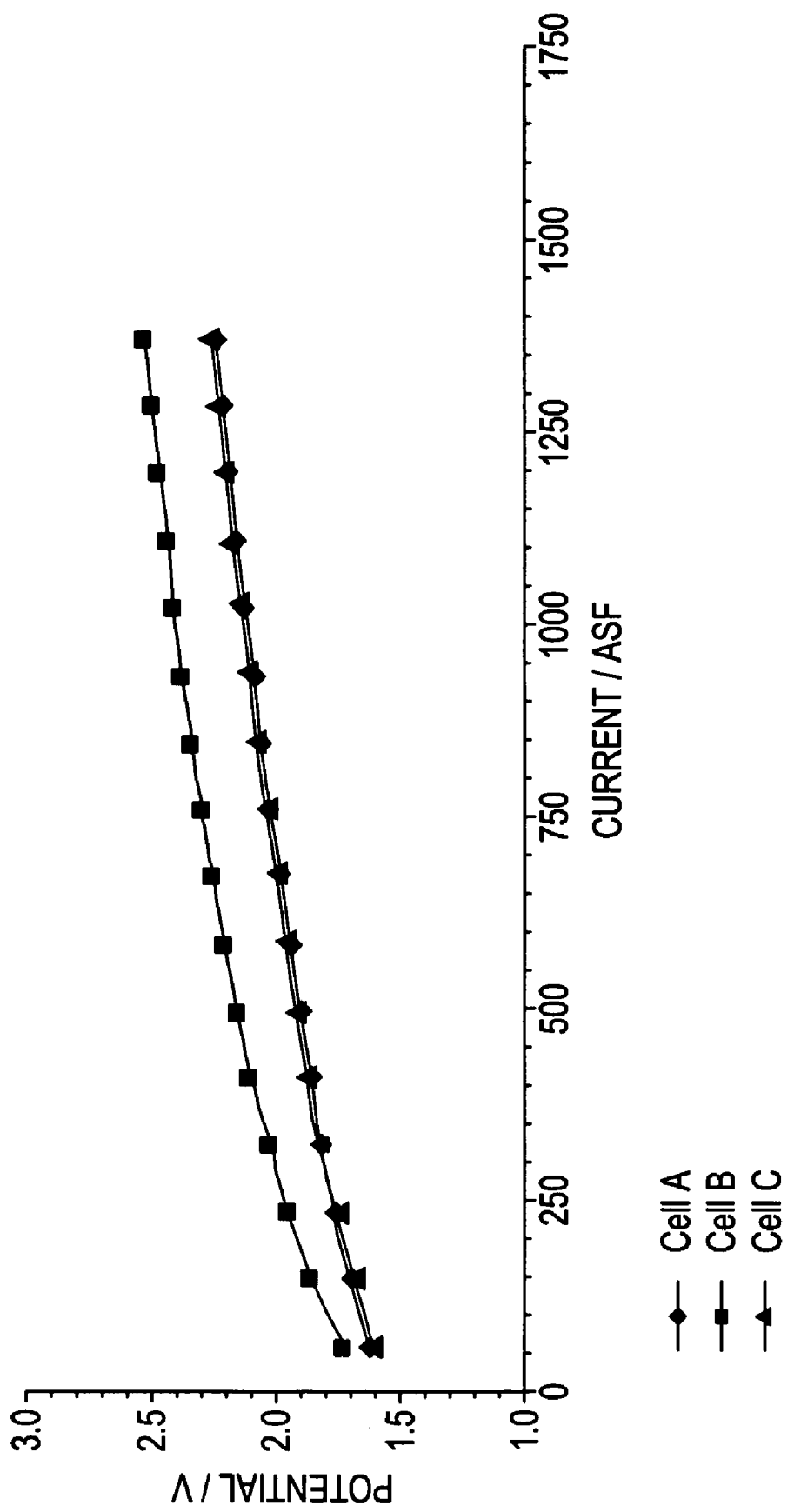
FIG. 4 is a polarization curve for Cell A, Cell B, and Cell C after a test duration of 4,074 hours.

The three MEAs (i.e., Cell A, Cell B, and Cell C) were stacked to form a 3-cell stack having a diameter a cell diameter of 91.5 cm$^2$ (0.1 ft$^2$). FIGS. 3 and 4 are polarization curves showing electrical potential in volts (V) and current density in amperes per square foot (ASF). FIG. 3 shows the results after a test run for a duration of 1,388 hours, whereas FIG. 4 shows the results after a test run for a duration of 4,074 hours.

FIGS. 3–4 illustrate that Cell A and Cell C performed similarly to Cell B. The three cells had an electrical potential of about 1.5 V to about 2.5 V, with a current density of about 50 A/ft$^2$ to about 1,400 A/ft$^2$. As noted above, Cell A and Cell C had a hydrogen side electrode having a platinum loading of about 0.5 mg/cm$^2$ to about 0.8 mg/cm$^2$ compared to a platinum loading of 4 mg/cm$^2$ for Cell B. In other words, Cell A and Cell C performed substantially the same as Cell B with a loading at least 4 times smaller than Cell B.

Advantageously, a catalyst ink composition of the instant disclosure offers a number of improvements over existing catalyst ink compositions. The catalyst ink composition of this disclosure may use only 1 pass during screen-printing, which may reduce overall production time and costs compared with methods that use 2 or more passes. Additionally, an electrode made using the catalyst ink may have reduced catalyst loadings compared to existing electrodes, which may result in cost savings. The hydrogen side electrode may have a catalyst loading of less than or equal to about 1.5 mg/cm$^2$.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of making an electrode layer, comprising: forming a catalyst ink comprising a catalyst compound, a perfluorinated sulfonyl fluoride polymer, and an ester, wherein in the ink comprises about 20 wt % to about 30 wt % of the catalyst compound, about 15 wt % to about 20 wt % the ester, about 40 wt % to about 50 wt % perfluorinated sulfonyl fluoride polymer, and about 5 wt % to about 10 wt % polyvinyl alcohol, wherein the weight percentages are based on the total weight of the ink;
disposing the catalyst ink on substrate; and
drying the catalyst ink to form the electrode layer on the substrate.

2. The method of claim 1 wherein the ester is synthesized from acetic acid.

3. The method of claim 2 wherein the ester is n-propyl acetate.

4. The method of claim 1, wherein the catalyst compound comprises platinum and the ester is n-propyl acetate.

5. The method of claim 1, wherein the catalyst compound is selected from the group consisting of platinum, palladium, rhodium, carbon, gold, tantalum, tungsten, ruthenium, iridium, osmium, and an alloy and combination comprising at least one of the foregoing catalyst compounds.

6. The method of claim 1 wherein the catalyst compound has a particle size of about 10 nanometers to about 100 nanometers.

7. The method of claim 1, wherein the electrode layer has a thickness of less than or equal to about 2 micrometers.

8. The method of claim 1, wherein the substrate is a decal.

9. The method of claim 1, wherein the substrate is a proton exchange membrane.

* * * * *